Jan. 27, 1970     S. I. WEISS     3,491,742
ANNULAR CUTTING BLADES
Filed May 19, 1967

INVENTOR.
Shirley I. Weiss
BY
ATTORNEY

# United States Patent Office 3,491,742
Patented Jan. 27, 1970

3,491,742
ANNULAR CUTTING BLADES
Shirley I. Weiss, 779 E. Crescent Ave.,
Ramsey, N.J. 07446
Filed May 19, 1967, Ser. No. 639,907
Int. Cl. B28d 1/04
U.S. Cl. 125—15                                6 Claims

ABSTRACT OF THE DISCLOSURE

An annular cutting blade of thin sheet metal with abrasive particles bonded to the inner cutting edge thereof; the blade being reinforced in surface areas thereof adjacent the deposit of abrasive particles, to thereby increase the normal life thereof and to substantially improve the cutting characteristics thereof.

BACKGROUND OF THE INVENTION

In cutting or slicing very hard materials such as silicon, sapphire, germanium or the like, for making electronic components and other useful industrial elements, it is common to use annular cutting blades, particularly very thin blades which have abrasive particles such as diamond grit bonded to the inner circumferential edge thereof.

Such known blades are mounted on rotating spindles of a cutting machine, the blade being tensioned and operated in a known manner to cut or slice a bar of hard material, with minimal waste of the material being cut; which waste is measured primarily by the gauge of the cutting blade which may be of the order of .005 inch or less.

The efficiency of such blades is measured by the number of cuts achieved by a single blade during its normal life, and the quality of the slicing operation in respect to the material being cut or sliced. The quality of the deposit of the diamond or other abrasive grit on the cutting edge of the blade and the efficiency of the operator in tensioning the blade on the cutting spindle; are primary factors in establishing the operating characteristics of the cutting blade.

However, it has also been found that the properties of the metal sheet stock, from which the blades are formed, have a material effect on the normal life expectancy of the blade, as well as its cutting efficiency. Thus, despite seeming uniformity in chemical and physical properties of the blade stock, blades made from one batch of metal stock will show a degree of fatigue substantially different from blades derived from another batch of metal stock. As a result, a seemingly good quality blade may turn out to have a limited working life, or may develop a deflection characteristic at its cutting edge which will result in poor quality slices.

SUMMARY OF THE INVENTION

The instant invention relates to annular cutting blades, particularly those formed of very thin gauge metal stock, having abrasive grit bonded to the inner circumferential edge thereof, which carries on opposite surface portions thereof and adjacent the bonded grit, thin metal increments which are effective to substantially improve the operating characteristics thereof.

An object of this invention is to provide a thin annular cutting blade of the character described, which has thin metal deposits on opposite sides thereof which lie adjacent the cutting edge thereof.

Another object of this invention is to provide an improved annular cutting blade of the character described, wherein with the blade in its clamped and tensioned condition on the cutting machine, the same will offer increased resistance to stresses when in actual use, to thereby materially reduce deflection thereof in the annular cutting area, and thus assure the production of uniform slices of cut material having parallel surfaces free of taper, bow or other objectionable surface phenomena.

Still another object of this invention is to provide a cutting blade of the character described, which is reinforced in surface areas adjacent the cutting edge thereof, said blade being adapted to be mounted on a cutting machine in a tensioned condition; with a substantial increase in the length of the time intervals between retensioning operations to maintain the blade in proper cutting condition, thereby materially reducing the down-time for retensioning operations and increasing the productive capacity of the blades.

Yet another object of this invention is to provide an improved cutting blade of the character described, which may be operated with an increased load applied to the cutting edge thereof, as by increasing the rate of feed of material being cut or sliced, to the rotating cutting edge, with materially reduced chances of deflection of the cutting edge, thereby assuring increased production rates for high quality cut slices free from taper or bow in the surfaces of the slices.

Yet a further object of this invention is to provide an annular cutting blade of the character described, which may be formed of blade stock having a gauge as small as about .001", thereby producing a kerf in the cut or sliced material of minimal dimensions and a substantial saving in waste material cost; such blades being highly resistant to splitting, deflection of the cutting edge under load, and other adverse characteristics while in use; yet lending itself to use with an increase in the rate of feed of material being cut or sliced; thereby increasing production rates.

DESCRIPTION OF THE PREFERRED EMBODIMENTS

Figure 1:
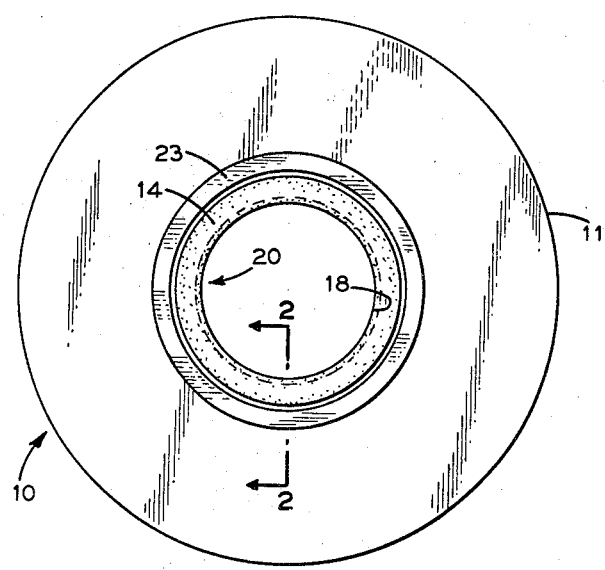
FIG. 1 is a front elevational view of a cutting blade embodying the invention.

In accordance with the instant invention, and as shown in the drawing, 10 designates an annular cutting blade embodying the invention. The same is formed from thin gauge metal stock, such as Phosphor-bronze, beryllium-copper, stainless steel, or the like. The stock is of a gauge of about .005" and may as little as .001". The blades 10 are punched out of such metal stock, in a conventional manner, thus providing the outer circumferential edge 11 and the inner circumferential edge 12.

Abrasive grit such as diamonds of selected size are deposited on edge 12 of blade 10, as at 13, by procedures known in the art.

Figure 2:
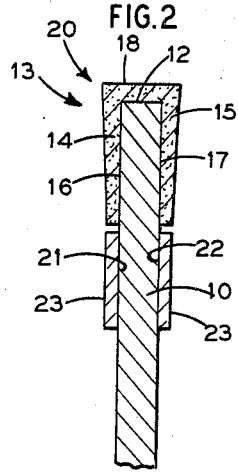
FIG. 2 is a sectional view taken on the line 2—2 of FIG. 1.

As shown in FIG. 2, abrasive grit deposit 13 comprises circumferential marginal portions 14, 15 which are adherent to marginal surface portions 16, 17 respectively of blade 10, at edge 12 thereof, together with a radially extending portion 18 which covers edge 12 and interconnects marginal portions 14, 15.

It will be apparent that the kerf produced by blade 10 when suitably mounted on the spindle of a cutting machine, not shown, and tensioned in a known manner; will be equal to the thickness of the blade 10 plus the thickness of grit deposit portions 14, 15. Thus, with a blade of .004" thickness and a thickness of .002" for each of deposit portions 14, 15; the kerf will have a transverse dimension of about .008". Obviously with blades of smaller gauges, the kerf is correspondingly reduced.

Such blades are suitably tensioned on the spindles of the cutting machines and clamped in position so as to tension the inner cutting edge indicated at 20. Such clamping means may take the form of a holder such as shown in applicant's Patent No. 3,175,548.

It has been found that the cutting properties of blade 10 may be substantially improved, to materially reduce premature splitting of the tensioned blades; to reduce undue deflection of the cutting edge 20 which gives rise to cut slices having tapering or bowed sides, rather than the desired parallel sides; and to increase production rates by permitting an increase in the rate of feed of the material being cut to the rotating cutting edge 20; and finally, increasing the periods between retensioning operations so as to increase the overall production size.

To this end, blade 10 has applied to the opposite surfaces 21, 22 adjacent surface portions 16, 17 respectively, thin metal deposits 23. Metal deposits 23 are annular and are located immediately adjacent grit portions 14, 15. The deposits 23 have a substantially uniform thickness which is no greater than the thickness of grit deposits 14, 15 and may be substantially less than the thickness of the grit deposits 14, 15.

Thus, the metal deposits 23 may have a thickness as little as .00001" and may be as much as .002". Preferably, the thickness of metal deposits 23 is suitably proportioned to the blade thickness and the thickness of grit deposits 14, 15. The metal deposits 23 have a radial dimension as little as $\frac{1}{16}$" but preferably is of the order of about $\frac{3}{4}$" or greater.

The metal deposits 23 are derived from a metal or alloy different from that from which blade 10 is formed. Thus, deposits 23 may be of nickel, cobalt, copper, cadmium, chromium, titanium, and alloys thereof. The deposits 23 are suitably formed as by plating or the like. When the blade 10 has been formed in the usual manner with the grit forming cutting edge 20, applied thereto; the grit portions 14, 15 and 18 are suitably masked and the blade is suspended in a suitable plating bath of the electrolytic or electroless type, not shown. Thus, a selected metal or alloy may be deposited to a desired thickness and radial dimension, by applying further masking to define the surface areas 21, 22 of blade 10.

While the deposit bands 23 are shown immediately adjacent the grit deposits 14, 15; such bands may be spaced somewhat from deposits 14, 15. Also, the reinforcing coatings or deposits may take forms other than annular, as for example radial stripes suitably spaced from each other, and the like.

It will be apparent that the deposits 23 are applied to those areas of the cutting blade 10, which normally project beyond the usual clamping and tensioning means in which the blade is mounted. Thus, the tendency for the cutting edge 20 to deflect under load, particularly with blades of the smaller gauges down to .001", is materially reduced.

As various changes might be made in the embodiments of the herein disclosed invention without departing from the spirit thereof, it is understood that all matter herein shown or described shall be deemed illustrative and not limiting except as set forth in the appended claims.

I claim:

1. An annular thin metal cutting blade having annular outer and inner edges, a deposit of abrasive grit cutting material bonded to the inner edge of said blade and to opposite marginal surface portions of said blade at the inner edge thereof, and thin annular metal bands of substantially uniform width and thickness on opposite surface portions of said blade, the inner edges of said annular metal bands being immediately adjacent the outer edge of the marginal surface deposits of abrasive grit.

2. A blade as in claim 1 wherein said deposits have a thickness of as little as .00001" and a maximum thickness no greater than that of the marginal surface deposits of abrasive grit.

3. A blade as in claim 1 wherein the thickness of said metal deposits is proportioned to the thickness of said blade.

4. A blade as in claim 3 wherein said blade has a thickness of from about .001" to about .005".

5. A blade as in claim 1 wherein the metal of said metal deposits is different from the metal of said blade.

6. A blade as in claim 5 wherein said metal deposits are nickel.

References Cited

UNITED STATES PATENTS

| | | | |
|---|---|---|---|
| 1,861,218 | 5/1932 | Huther | 143—133 |
| 2,763,258 | 9/1956 | Hughes | 125—15 |
| 3,039,235 | 6/1962 | Heinrich | 51—73 |
| 3,205,624 | 9/1965 | Weiss | 51—206 |

HAROLD D. WHITEHEAD, Primary Examiner

U.S. Cl. X.R.

51—73